US009543790B2

(12) United States Patent
Kim et al.

(10) Patent No.: US 9,543,790 B2
(45) Date of Patent: Jan. 10, 2017

(54) APPARATUS FOR TRANSMITTING MAGNETIC RESONANCE WIRELESS POWER USING HIGHER ORDER MODE RESONANCE, RECEIVING TERMINAL, AND METHOD FOR TRANSMITTING AND RECEIVING WIRELESS POWER USING THE SAME

(71) Applicant: Electronics and Telecommunications Research Institute, Daejeon (KR)

(72) Inventors: Seong-Min Kim, Daejeon (KR); Jung Ick Moon, Daejeon (KR); In Kui Cho, Daejeon (KR); Woo Jin Byun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 692 days.

(21) Appl. No.: 13/943,380

(22) Filed: Jul. 16, 2013

(65) Prior Publication Data
US 2014/0203655 A1 Jul. 24, 2014

(30) Foreign Application Priority Data

Jan. 24, 2013 (KR) .......................... 10-2013-0008057
Feb. 28, 2013 (KR) .......................... 10-2013-0021915

(51) Int. Cl.
*H02J 50/12* (2016.01)
*H02J 17/00* (2006.01)
(52) U.S. Cl.
CPC ............... *H02J 17/00* (2013.01); *H02J 50/12* (2016.02)

(58) Field of Classification Search
None
See application file for complete search history.

(56) References Cited

U.S. PATENT DOCUMENTS

| 7,751,899 | B1 * | 7/2010 | Karunasiri | ......... | A61N 1/36032 607/57 |
| 7,999,414 | B2 * | 8/2011 | Bruhn | ..................... | H01F 38/14 307/104 |
| 2008/0076366 | A1 * | 3/2008 | Rofougaran | ......... | H04B 1/0458 455/168.1 |
| 2009/0284245 | A1 * | 11/2009 | Kirby | ................... | G06K 7/0008 323/318 |

(Continued)

FOREIGN PATENT DOCUMENTS

| KR | 10-2011-0074020 A | 6/2011 |
| KR | 10-2012-0088266 A | 8/2012 |
| WO | WO 2011/062827 A2 | 5/2011 |

*Primary Examiner* — Rexford Barnie
*Assistant Examiner* — David Shiao

(57) ABSTRACT

A method includes matching a basic mode frequency signal and a higher order mode frequency signal to a multi-band frequency signal with respect to a signal in the form of the square wave, transferring the matched basic mode frequency signal and higher order mode frequency signal simultaneously to a multi-resonance reception resonator, converting output impedance of the basic mode frequency and the higher order mode frequency which are received through the reception resonator into a conjugate value of input impedance of the basic mode frequency and the higher order mode frequency of a receiver, and converting the converted multi-band frequency signal into an electric power that is required in a load and transferring the electric power to the load.

12 Claims, 6 Drawing Sheets

(56) References Cited

U.S. PATENT DOCUMENTS

| | | |
|---|---|---|
| 2011/0156490 A1 | 6/2011 | Hwang et al. |
| 2012/0049861 A1* | 3/2012 | Kim ........................ H02J 17/00 |
| | | 324/633 |
| 2012/0112535 A1* | 5/2012 | Karalis ............... B60L 11/1812 |
| | | 307/10.1 |
| 2012/0267961 A1* | 10/2012 | Endo ....................... H02J 5/005 |
| | | 307/104 |
| 2013/0099584 A1* | 4/2013 | Von Novak, III ... H04B 5/0037 |
| | | 307/104 |

* cited by examiner

Prior Art

Prior Art

Prior Art

Prior Art

APPARATUS FOR TRANSMITTING MAGNETIC RESONANCE WIRELESS POWER USING HIGHER ORDER MODE RESONANCE, RECEIVING TERMINAL, AND METHOD FOR TRANSMITTING AND RECEIVING WIRELESS POWER USING THE SAME

CROSS-REFERENCE TO RELATED APPLICATIONS(S)

This application claims the benefit of Korean Patent Application No. 10-2013-0008057, filed on Jan. 24, 2013 and Korean Patent Application No. 10-2013-0021915, filed on Feb. 28, 2013, which are hereby incorporated by references as if fully set forth herein.

BACKGROUND

1. Field

The present invention relates to a wireless power transmission technique using magnetic resonance, and more particularly to an apparatus for transmitting magnetic resonance wireless power using higher order mode resonance, a receiving terminal, and a method for transmitting and receiving wireless power using the same, which are suitable to overcome efficiency deterioration due to the basic characteristics of the existing magnetic resonance type wireless power transmission.

2. Description of Related Art

In general, magnetic resonance type wireless power transmission is preformed in a manner that a transmission device generates a frequency signal that corresponds to a basic mode resonance of a resonator and transfers the generated frequency signal to the resonator to wirelessly transfer electric power. In this case, in order to increase the signal generation efficiency of the transmission device, the transmission device is configured to have an inverter or switching amplifier structure.

In such an inverter or switching amplifier structure, the basic output waveform in a time domain appears in the form of a square wave, and according to this square wave signal, about 85% of the overall power appears in a basic mode resonance frequency and the remaining power appears in a higher mode resonance frequency signal. According to an existing method for transmitting magnetic resonance type wireless power, the basic mode resonance frequency signal of the resonator is transferred with high efficiency, but the higher mode resonance frequency signal has very low transmission efficiency. Accordingly, only the basic mode resonance frequency component of the transmission device signal is transferred with high efficiency, but the higher mode resonance frequency signal is unable to be transferred well.

FIG. 1 is a block diagram illustrating the configuration of a typical apparatus for transmitting magnetic resonance type wireless power. The apparatus for transmitting magnetic resonance type wireless power in the related art includes a transmitter 102, a transmission resonator 104, a reception resonator 106, and a receiver 108.

Referring to FIG. 1, the transmission resonator 104 and the reception resonator 106 of the apparatus for transmitting wireless power in the related art can transfer the basic mode frequency signal of each resonator with high efficiency, but the transfer efficiency of the higher mode frequency signal is very low. Accordingly, the existing system for transmitting magnetic resonance type wireless power has evolved in the direction to improve the efficiency of the basic mode frequency signal.

FIG. 2 is a characteristic graph showing the transfer characteristics between the existing magnetic resonance type transmission resonator and the reception resonator.

Referring to FIG. 2, according to the transfer characteristics between the existing magnetic resonance type transmission resonator 104 and the reception resonator 106, the basic mode resonance frequency of 1.79 MHz has a value of about −1.0 dB, the third-order mode resonance frequency of 5.4 MHz has a value of about −70.1 dB, and the fifth-order mode resonance frequency of 8.82 MHz has a value of about −41.0 dB. According to the transfer characteristics between the existing magnetic resonance type transmission resonator 104 and the reception resonator 106 as described above, high transfer characteristics appear at the basic mode resonance frequency, and lower transfer characteristics appear at the higher mode resonance frequencies.

FIGS. 3A and 3B illustrate a waveform of a square wave, which is an output waveform of a general high-efficiency transmitter, in a time domain and a waveform of the square wave in a frequency domain. Referring to FIGS. 3A and 3B, the time-domain waveform of the square wave appears to be repeated for a predetermined period, and the frequency-domain waveform of the square wave appears to be generated for the basic mode and the odd-numbered high-order modes as expressed in Equation 1 below.

$$x(f) = \frac{1}{2} + \frac{2}{\pi}\cos(f_0) + \frac{2}{3\pi}\cos(3f_0) + \frac{2}{5\pi}\cos(5f_0) + \frac{2}{7\pi}\cos(7f_0) + \quad \text{[Equation 1]}$$

If power rates by modes in the frequency domain of the square wave is calculated through multiplication of respective coefficients of the basic mode frequency and the higher mode frequencies of the square wave expressed in Equation 1 above, about 85% of power appears at the basic mode frequency, about 9.5% of power appears at the third-order mode frequency, about 3.4% of power appears at the fifth-order mode frequency, and about 0.02% of power appears at the seventh-order mode frequency.

As shown in FIGS. 3A and 3B and expressed in Equation 1, if the square wave, which is an output waveform of the general high-efficiency transmitter, is transmitted using the existing magnetic resonance method, only 85% of the overall power can be transferred. This causes the power transfer efficiency of the whole system to be lowered and waste of energy to occur.

SUMMARY

The present invention proposes a method for improving the existing magnetic resonance type power transmission efficiency in wireless power transmission using a magnetic resonance method. The present invention has the characteristics to improve the efficiency of magnetic resonance type wireless power transmission by proposing a method capable of transferring even the power of higher mode resonance frequency signals through improvement of problems of the existing magnetic resonance type resonator transfer characteristics, in which the power transfer characteristics of the basic mode resonance frequency are superior, but the power transfer characteristics of the higher order mode resonance frequencies are low, and thus the higher order mode signals are unable to be transferred to lower the basic efficiency.

In accordance with the present invention, the method capable of overcoming the problems of the existing magnetic resonance method, in which only the basic mode frequency signal is transmitted to lower the transmission efficiency, is proposed. By using the higher order modes according to the present invention, the efficiency of the magnetic resonance type wireless power transmission can be improved, and energy saving effects can be realized.

In accordance with an aspect of the exemplary embodiment of the present invention, there is provided an apparatus for transmitting magnetic resonance wireless power using higher order mode resonance, which includes a transmitter, which generates a signal in the form of a square wave to generate a high-efficiency signal, a transmission matcher, which matches a basic mode frequency signal and a higher order mode frequency signal to a multi-band frequency signal with respect to the generated signal in the form of the square wave, and a multi-resonance transmission resonator, which performs wireless transmission of the matched basic mode frequency signal and higher order mode frequency signal simultaneously to a multi-resonance reception resonator.

In the exemplary embodiment, the transmission matcher may be converted output impedance of the basic mode frequency and the higher order mode frequency of the transmitter into a conjugate value of input impedance of the basic mode frequency and the higher order mode frequency of the transmission resonator.

In the exemplary embodiment, the higher order mode frequency signal is a third order mode frequency signal or a fifth order mode frequency signal.

In the exemplary embodiment, the transmission resonator may be had the same size and shape as the reception resonator.

In the exemplary embodiment, the transmission resonator may be had a size and a shape which are different from a size and a shape of the reception resonator.

In accordance with another aspect of the exemplary embodiment of the present invention, there is provided a wireless power receiving terminal using higher order mode resonance, which includes a multi-resonance reception resonator, which receives a basic mode frequency signal and a higher order mode frequency signal which are wirelessly transmitted from a multi-resonance transmission resonator of an apparatus for transmitting wireless power, a reception matcher, which converts output impedance of the basic mode frequency and the higher order mode frequency which are input from the reception resonator into a conjugate value of input impedance of the basic mode frequency and the higher order mode frequency of the receiver, and the receiver, which converts a multi-band frequency signal that is input from the reception matcher into an electric power that is required in a load and transfers the electric power to the load.

In the exemplary embodiment, the reception resonator may be had the same size and shape as the transmission resonator.

In the exemplary embodiment, the reception resonator may be had a size and a shape which are different from a size and a shape of the transmission resonator.

In accordance with further another aspect of the exemplary embodiment of the present invention, there is provided a method for transmitting and receiving magnetic resonance wireless power using higher order mode resonance, which includes matching a basic mode frequency signal and a higher order mode frequency signal to a multi-band frequency signal with respect to a signal in the form of the square wave, transferring the matched basic mode frequency signal and higher order mode frequency signal simultaneously to a multi-resonance reception resonator, converting output impedance of the basic mode frequency and the higher order mode frequency which are received through the reception resonator into a conjugate value of input impedance of the basic mode frequency and the higher order mode frequency of a receiver, and converting the converted multi-band frequency signal into an electric power that is required in a load and transferring the electric power to the load.

In the exemplary embodiment, the matching may be converted the output impedance of the basic mode frequency and the higher order mode frequency into the conjugate value of the input impedance of the basic mode frequency and the higher order mode frequency of the transmission resonator.

BRIEF DESCRIPTION OF THE DRAWINGS

The objects and qualities of the present invention will become apparent from the following description of embodiments given in conjunction with the accompanying drawings, in which.

DETAILED DESCRIPTION

The aspects and qualities of the present invention and methods for achieving the aspects and qualities will be apparent by referring to embodiment 1 to be described in detail with reference to the accompanying drawings. Here, the present invention is not limited to the embodiment 1 disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims.

Further, in the following description of the present invention, a detailed description of known functions and configurations incorporated herein will be omitted when it may make the subject matter of the present invention rather unclear. Also, the following terms are defined considering functions of the present invention, and may be differently defined according to the intention of an operator or custom. Therefore, the terms should be defined based on the overall contents of the specification.

Hereinafter, preferred embodiment 1 of the present invention will be described in detail with reference to the accompanying drawings.

[Embodiment 1]

Figure 1:
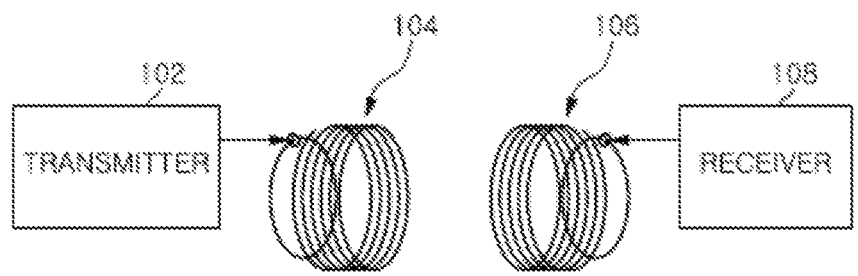
FIG. 1 is a block diagram illustrating the configuration of a typical apparatus for transmitting magnetic resonance type wireless power.
Figure 2:
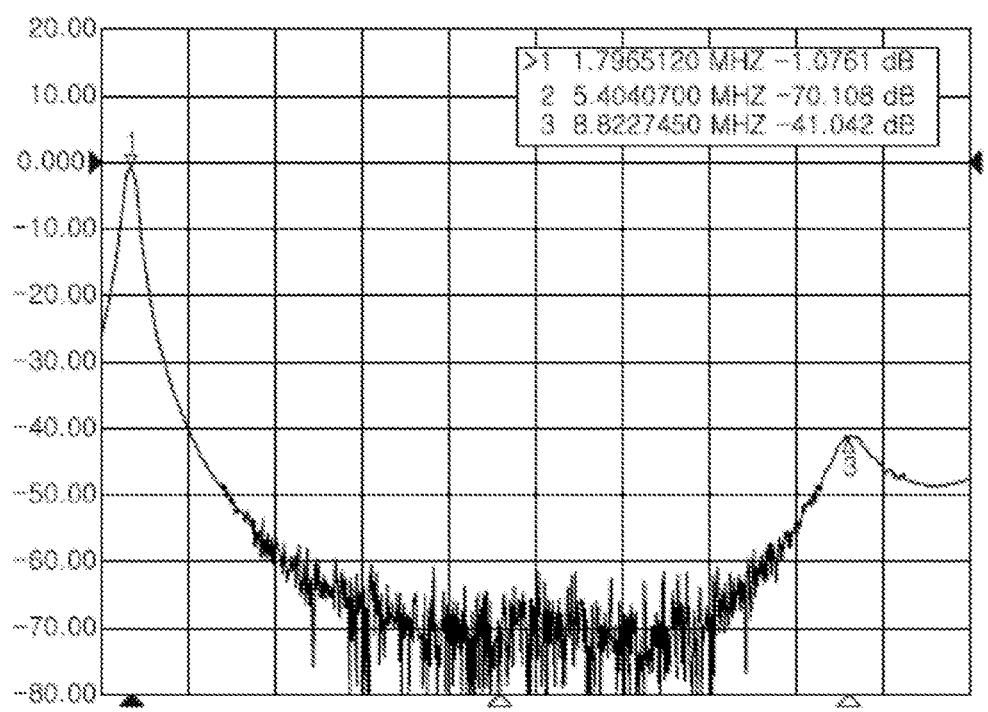
FIG. 2 is a characteristic graph showing the transfer characteristics between the existing magnetic resonance type transmission resonator and the reception resonator.
Figure 3A:
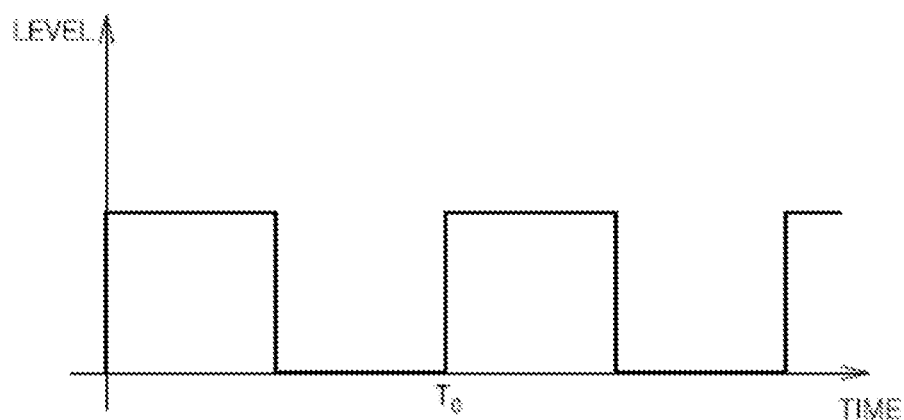
FIGS. 3A and 3B are waveform diagrams illustrating a waveform of a square wave, which is an output waveform of a general high-efficiency transmitter, in a time domain and a waveform of the square wave in a frequency domain.
Figure 3B:
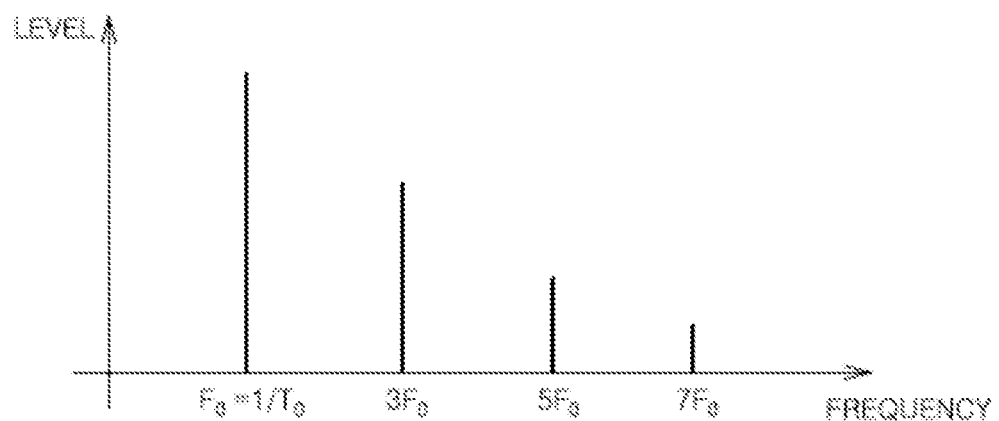
Figure 4:
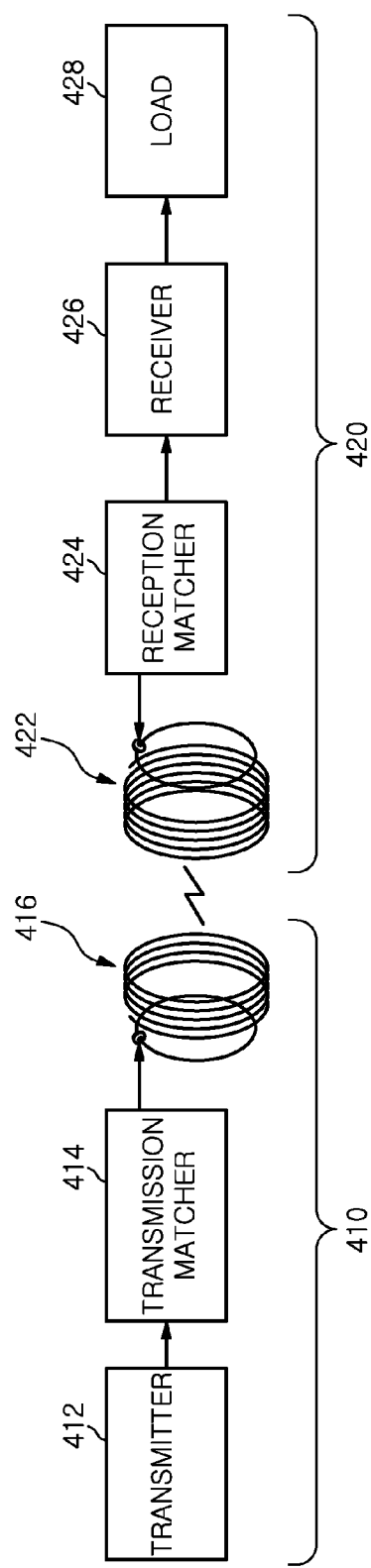
FIG. 4 is a block diagram illustrating the configuration of an apparatus for transmitting magnetic resonance type wireless power and a receiving terminal according to embodiment 1 of the present invention.

FIG. 4 is a block diagram illustrating the configuration of an apparatus for transmitting magnetic resonance type wireless power and a receiving terminal according to embodiment 1 of the present invention. Briefly, embodiment 1 may include an apparatus 410 for transmitting wireless power and a receiving terminal 420. The apparatus 410 for transmitting wireless power may include a transmitter 412, a transmission matcher 414, and a transmission resonator 416, and the receiving terminal 420 may include a reception resonator 422, a reception matcher 424, and a receiver 426. Here, the receiving terminal 420 may be, for example, a mobile communication terminal, a personal portable communication terminal, a smart phone, a wireless LAN terminal, a tablet PC, a slate PC, a desktop computer, or a notebook PC.

Referring to FIG. 4, according to the apparatus for transmitting magnetic resonance type wireless power and the receiving terminal according to embodiment 1 of the present invention, more than 99% of square wave signal power exists in a basic mode and higher order modes (e.g., third order mode, fifth order mode, and the like).

Accordingly, the apparatus for transmitting the magnetic resonance wireless power using higher order modes according to the present invention is to transmit a basic mode frequency signal and a higher order mode frequency signal up to the fifth order mode, and may transmit the basic mode and the third order mode only in accordance with a user's need or the configuration of the transmission and reception resonators.

First, the transmitter 412 on the side of the apparatus 410 for transmitting the wireless power may provide a function of generating a signal in the form of a square wave in order to generate a high-efficiency signal, and the transmission matcher 414 may provide a function of matching a multi-band frequency signal in order to transfer the basic mode frequency signal (basic mode resonance frequency signal) and the higher order mode frequency signal (higher mode resonance frequency signal) to the multi-resonance transmission resonator 416 to be described later without loss.

That is, the transmission matcher 414 according to the present invention may convert output impedance of the basic mode frequency and the third and fifth order mode frequencies of the transmitter 412 into a conjugate value of input impedance of the basic mode frequency and the third and fifth order mode frequencies of the multi-resonance transmission resonator 416. Such a conjugate matching method can transfer the maximum power of the basic mode frequency signal and the third and fifth order mode frequency signals.

Next, the multi-resonance transmission resonator 416 may perform wireless transmission (transfer) of the basic mode frequency signal and the higher order mode frequency signals, which are used in the existing magnetic resonance method, simultaneously to the receiving terminal 420, that is, to the multi-resonance reception resonator 422, without loss. In this case, the multi-resonance transmission resonator 416 may have the same size and shape as the multi-resonance reception resonator 422, or may have the size and shape which are different from the size and shape of the multi-resonance reception resonator 422.

Further, the multi-resonance transmission resonator 416 that is applied to the apparatus 410 for transmitting the wireless power according to the present invention and the multi-resonance reception resonator 422 of the receiving terminal 420 perform wireless transmission and reception of the basic mode frequency signal and the third and fifth order mode frequency signals, and may be configured to transfer the basic mode frequency signal and the third order mode frequency signal only in accordance with the user's need.

On the other hand, the multi-resonance reception resonator 422 in the receiving terminal 420 may transfer the received signal (multi-band frequency signal) to the reception matcher 424, and the reception matcher 424 may transfer the input multi-band frequency signal to the receiver 426 without loss. Here, the reception matcher 424 may convert output impedance of the basic mode frequency and the third and fifth order mode frequencies of the multi-resonance reception resonator 422 into a conjugate value of input impedance of the basic mode frequency and the third and fifth order mode frequencies of the receiver 426. In this case, the multi-resonance reception resonator 422 may have the same size and shape as the multi-resonance transmission resonator 416 in the apparatus 410 for transmitting the wireless power.

The receiver 426 may convert the multi-band frequency signal that is transferred from the reception matcher 424 into an electric power that is required in a load 428 and transfer the electric power to the load 428. The load 428 may perform a desired operation using the power (supply) transferred (input) from the receiver 426.

Figure 5:
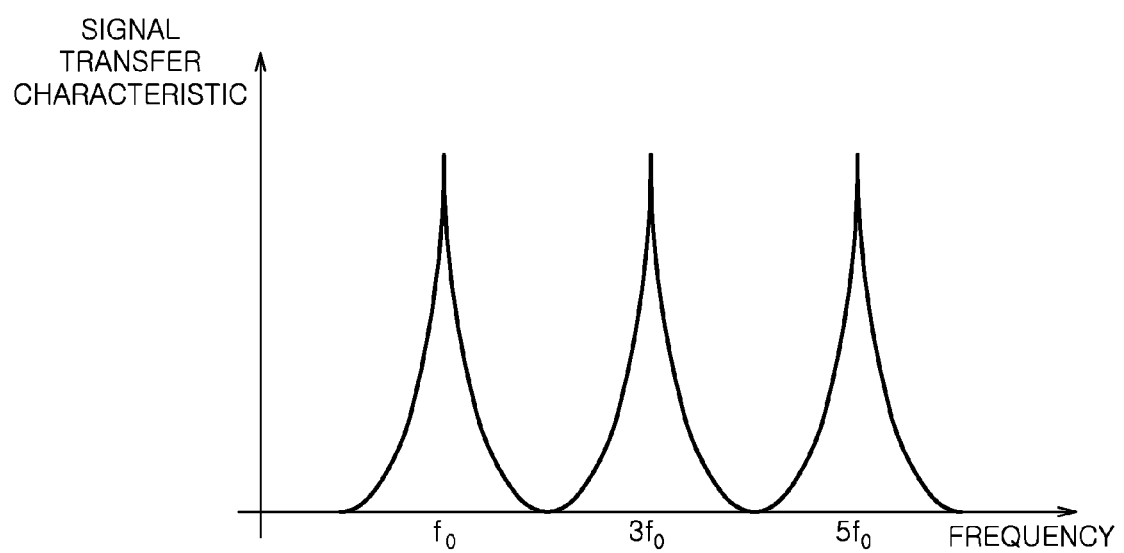
FIG. 5 is a characteristic diagram illustrating signal transfer characteristics between a multi-resonance transmission resonator and a multi-resonance reception resonator according to embodiment 1 of the present invention.

FIG. 5 is a characteristic diagram illustrating signal transfer characteristics between the multi-resonance transmission resonator and the multi-resonance reception resonator according to embodiment 1 of the present invention.

Referring to FIG. 5, according to the signal transfer characteristics between the multi-resonance transmission resonator 416 in the apparatus 410 for transmitting the wireless power according to the present invention and the multi-resonance reception resonator 422 in the receiving terminal 420, the basic mode frequency signal and the third and fifth order mode frequency signals can be transferred without loss. The multi-resonance transmission resonator 416 and the multi-resonance reception resonator 422 having the above-described characteristics may be implemented with various sizes and shapes, which are equal to each other or different from each other.

The method for transmitting and receiving magnetic resonance wireless power using higher order mode resonance according to embodiment 1 of the present invention is to improve the transmission efficiency that is one of the problems of the existing magnetic resonance method, and can transfer the overall power of the transmission device (transmitter) to the reception device (receiver) without loss. By performing the magnetic resonance type wireless power transmission and reception according to the proposed method of the present invention, the power efficiency can be improved and the energy can be saved. Further, by selecting the basic mode and the order of the higher order mode in accordance with the user's need, the transmission efficiency can be adjusted.

The above description of the present invention is merely exemplary, and it will be understood by those of ordinary skill in the art to which the present invention pertains that various changes in form and detail may be made therein without changing the technical idea or essential features of the present invention. Accordingly, it will be understood that the above-described embodiments are exemplary in all aspects and do not limit the scope of the present invention.

Accordingly, the scope of the present invention is defined by the appended claims, and it will be construed that all technical features in the equivalent range fall within the scope of the present invention.

What is claimed is:

1. An apparatus for transmitting magnetic resonance wireless power using higher order mode resonance, comprising:
   a transmitter, which generates a signal in the form of a square wave to generate a high-efficiency signal;
   a transmission matcher, which receives the signal in the form of a square wave and which matches impedances of a basic mode frequency signal and a higher order mode frequency signal of the signal in the form of a square wave to corresponding impedances of a multi-band frequency signal to be input to a multi-resonance reception resonator; and
   a multi-resonance transmission resonator, which performs wireless transmission of the impedance matched basic mode frequency signal and higher order mode frequency signal simultaneously to the multi-resonance reception resonator,
   wherein the transmission matcher converts output impedance of the transmitter with respect to the basic mode frequency and the higher order mode frequency into a conjugate value of input impedance of the transmission resonator with respect to the basic mode frequency and the higher order mode frequency.

2. The apparatus of claim 1, wherein the higher order mode frequency signal is a third order mode frequency signal or a fifth order mode frequency signal.

3. The apparatus of claim 1, wherein the transmission resonator has the same size and shape as the reception resonator.

4. The apparatus of claim 1, wherein the transmission resonator has a size and a shape which are different from a size and a shape of the reception resonator.

5. A system for transmitting and receiving magnetic resonance wireless power using higher order mode resonance, comprising:
   the apparatus of claim 1; and
   a wireless power receiving terminal, including:
   a multi-resonance reception resonator, which receives the basic mode frequency signal and the higher order mode frequency signal which are wirelessly transmitted from the multi-resonance transmission resonator of the apparatus for transmitting wireless power;
   a reception matcher, which converts output impedance of the multi-resonance reception resonator with respect to the basic mode frequency and the higher order mode frequency which are input from the reception resonator into a conjugate value of input impedance of a receiver with respect to the basic mode frequency and the higher order mode frequency; and
   the receiver, which converts the multi-band frequency signal that is input from the reception matcher into an electric power that is required in a load and transfers the electric power to the load.

6. The system of claim 5, wherein the higher order mode frequency signal is a third order mode frequency signal or a fifth order mode frequency signal.

7. The system of claim 5, wherein the reception resonator has the same size and shape as the transmission resonator.

8. The system of claim 5, wherein the reception resonator has a size and a shape which are different from a size and a shape of the transmission resonator.

9. A method for transmitting and receiving magnetic resonance wireless power higher order mode resonance, comprising:
   providing the apparatus of claim 1,
   matching, by the transmission matcher, the basic mode frequency signal and the higher order mode frequency signal to the multi-band frequency signal;
   transferring, by the multi-resonance transmission resonator, the matched basic mode frequency signal and higher order mode frequency signal simultaneously to the multi-resonance reception resonator,
   converting output impedance of the multi-resonance reception resonator with respect to the basic mode frequency and the higher order mode frequency which are received through the multi-resonance reception resonator into a conjugate value of input impedance of a receiver with respect to the basic mode frequency and the higher order mode frequency; and
   converting the converted multi-band frequency signal into an electric power that is required in a load and transferring the electric power to the load.

10. The method of claim 9, wherein the matching converts the output impedance of the transmitter with respect to the basic mode frequency and the higher order mode frequency into the conjugate value of the input impedance of the transmission resonator with respect to the basic mode frequency and the higher order mode frequency.

11. The method of claim 9, wherein the higher order mode frequency signal is a third order mode frequency signal or a fifth order mode frequency signal.

12. The apparatus of claim 1, wherein the multi-resonance transmission resonator selectively suppresses wireless transmission of the higher order mode frequency signal in accordance with a user's need, or a configuration of the multi-resonance transmission resonator and a configuration of the multi-resonance reception resonator.

* * * * *